US009682538B2

(12) United States Patent
Yu

(10) Patent No.: US 9,682,538 B2
(45) Date of Patent: Jun. 20, 2017

(54) INSTALLING STRUCTURE FOR PLATE FIXING MEMBER FOR LAMINATING MACHINE, TOP PLATE AND LAMINATING MACHINE

(71) Applicant: SHENZHEN CHINA STAR OPTOELECTRONICS TECHNOLOGY CO., LTD., Shenzhen, Guangdong (CN)

(72) Inventor: Wei Yu, Shenzhen (CN)

(73) Assignee: Shenzhen China Star Optoelectronics Technology, Co., Ltd., Shenzhen, Guangdong (CN)

( * ) Notice: Subject to any disclaimer, the term of this patent is extended or adjusted under 35 U.S.C. 154(b) by 453 days.

(21) Appl. No.: 14/241,821

(22) PCT Filed: Jan. 17, 2014

(86) PCT No.: PCT/CN2014/070825
§ 371 (c)(1),
(2) Date: Jun. 3, 2014

(87) PCT Pub. No.: WO2015/100807
PCT Pub. Date: Jul. 9, 2015

(65) Prior Publication Data
US 2015/0202849 A1    Jul. 23, 2015

(30) Foreign Application Priority Data

Dec. 31, 2013  (CN) .......................... 2013 1 0752235

(51) Int. Cl.
*B32B 37/00*    (2006.01)
*B32B 38/18*    (2006.01)

(52) U.S. Cl.
CPC ...... *B32B 37/0046* (2013.01); *B32B 38/1858* (2013.01); *B32B 2315/08* (2013.01); *Y10T 29/53* (2015.01)

(58) Field of Classification Search
CPC ...................... B32B 37/0046; B32B 38/1858
(Continued)

(56) References Cited

U.S. PATENT DOCUMENTS 6,789,595 B2 * 9/2004 Hayafuji ............. B30B 15/0064
156/228
2004/0089415 A1    5/2004 Byun et al. .................. 156/285

FOREIGN PATENT DOCUMENTS

CN    1447166 A    10/2003
CN    102468140 A    5/2012
(Continued)

OTHER PUBLICATIONS

International Search Report dated Nov. 27, 2014, issued to International Application No. PCT/CN2014/070825.

*Primary Examiner* — James Sells
(74) *Attorney, Agent, or Firm* — Kim Winston LLP

(57) ABSTRACT

The present disclosure relates to a device for mounting a plate fixing member in a laminating machine, including a mounting slot for mounting the plate fixing member. The plate fixing member is arranged in the mounting slot and can move vertically in the mounting slot. An elastic reset member is arranged between the plate fixing member and the mounting slot. With the movable plate fixing member being arranged in the mounting slot and the movement of the plate fixing member in the mounting slot being controlled by the elastic reset member, the plate fixing member can move into the mounting slot without an overpressure phenomenon of the glass plates at the plate fixing member when the top plate moves downwards and press-fits the upper glass plate and the lower glass plate. Therefore, the yield of products can be (Continued)

improved, and the production cost can be reduced. The present disclosure further relates to a top plate for a laminating machine and a laminating machine, with which the overpressure phenomenon of the glass plates caused by the plate fixing member can be effectively reduced.

17 Claims, 4 Drawing Sheets

(58) Field of Classification Search
USPC .............................. 156/228, 580, 581, 583.1
See application file for complete search history.

(56) References Cited

FOREIGN PATENT DOCUMENTS

| | | |
|---|---|---|
| CN | 202264465 U | 6/2012 |
| CN | 202573217 U | 12/2012 |
| EP | 1 894 903 A1 | 3/2008 |

* cited by examiner

INSTALLING STRUCTURE FOR PLATE FIXING MEMBER FOR LAMINATING MACHINE, TOP PLATE AND LAMINATING MACHINE

FIELD OF THE INVENTION

The present disclosure relates to production of liquid crystal panels, and in particular to a device for mounting a plate fixing member in a laminating machine, a top plate, and a laminating machine.

BACKGROUND OF THE INVENTION

Liquid crystal panels are widely used due to numerous advantages of thin body, power saving, no radiation, and the like. At present, in the manufacturing process of a fiber distribution frame and organic light emitting diode glass of a liquid crystal panel, two glass plates need to be laminated in pair using a laminating machine.

As shown in FIG. 1 and FIG. 2, the common laminating machine includes a top plate 11 for fixing an upper glass plate 12, and a base plate 13 for fixing a lower glass plate 14. During operation, the upper glass plate 12 is fixed on the top plate 11, and the lower glass plate 14 is fixed on the base plate 13. Then, the laminating machine is vacuumized, and the top plate 11 moves downwards to align and then press-fit the upper glass plate 12 and the lower glass plate 14. When the upper glass plate 12 is fixed on the top plate 11, the upper glass plate 12 is generally fed onto the bottom surface of the top plate 11 through a manipulator, and then the upper glass plate 12 is sucked through a vacuum pipeline 15 (shown in FIG. 2) on the top plate 11, so that the upper glass plate 12 can be in contact with a plate fixing member 16 arranged on the top plate 11. Subsequently, the plate fixing member 16 and the upper glass plate 12 are continuously pressed to each other through suction of the vacuum pipeline 15, so that the upper glass plate 12 can be engaged with and secured by the plate fixing member 16.

When the upper glass plate 12 is fixed on the top plate 11, the plate fixing member 16 should contact with the upper glass plate 12, thus forming an engagement therewith. Therefore, the plate fixing member 16 is mounted in a mounting slot 17 formed at the bottom surface of the top plate 11, and the bottom surface of the plate fixing member 16 should extend out of the mounting slot 17. That is to say, the bottom surface of the plate fixing member 16 should be located beneath the bottom surface of the top plate 11, as shown in FIG. 2. In this manner, the upper glass plate 12 can be conveniently engaged with and secured by the plate fixing member 16.

However, when the top plate 11 moves downwards and press-fits the upper glass plate 12 and the lower glass plate 14, because the bottom surface of the plate fixing member 16 with such a structure is located beneath the bottom surface of the top plate 11, an overpressure phenomenon will occur in the glass plates due to the overdue pressure at the plate fixing member 16. Thus the glass plates will suffer a light spot defect. Accordingly, the yield of products will decline, and the manufacturing cost will be increased.

SUMMARY OF THE INVENTION

With respect to the above defects existing in the prior art, the present disclosure aims to provide a device for mounting a plate fixing member for a laminating machine, a top plate and the laminating machine, with which an overpressure phenomenon of glass plates caused by the plate fixing member can be effectively reduced.

(1) A' device for mounting a plate fixing member in a laminating machine provided in the present disclosure includes the plate fixing member and a mounting slot for mounting the plate fixing member, wherein the plate fixing member is arranged in the mounting slot and can move vertically in the mounting slot, and an elastic reset member is arranged between the plate fixing member and the mounting slot;

when the elastic reset member stretches, a first end of the plate fixing member along a vertical direction extends to a region exterior of the opening of the mounting slot along the vertical direction; and when the first end is subjected to a vertical pressure towards the interior of the mounting slot, the plate fixing member moves vertically towards the interior of the mounting slot and thus compresses the elastic reset member.

(2) In a preferred embodiment of (1) of the present disclosure, one end of the elastic reset member is vertically connected with a vertical bottom of the mounting slot, and the other end thereof is vertically connected with a vertical second end of the plate fixing member.

(3) In a preferred embodiment of (1) or (2) of the present disclosure, the elastic reset member is a compression spring.

(4) In a preferred embodiment of (3) of the present disclosure, the plate fixing member is connected and fixed with the mounting slot through at least one connecting member, which vertically penetrates the plate fixing member and is fixedly connected with the vertical bottom of the mounting slot, the plate fixing member being in sliding engagement with the connecting member.

(5) In a preferred embodiment of (4) of the present disclosure, the connecting member penetrates the compression spring.

(6) In a preferred embodiment of (4) or (5) of the present disclosure, a plurality of connecting members are provided and uniformly distributed on the plate fixing member.

(7) In a preferred embodiment of (4) or (5) of the present disclosure, the connecting member is a half thread bolt.

(8) A top plate for the laminating machine provided in the present disclosure includes a plate body, and at least one device for mounting the plate fixing member in a laminating machine of any of (1) to (7) on the plate body, wherein the mounting slot is formed at the vertical lower end of the plate body.

(9) In a preferred embodiment of (8) of the present disclosure, a vacuum suction port is formed at the vertical lower end of the plate body, and a vacuum pipeline communicated with the vacuum suction port is arranged in the plate body.

(10) The laminating machine provided in the present disclosure includes a base plate, and the top plate for the laminating machine according to (8) or (9).

Compared with the prior art, in the device for mounting a plate fixing member in a laminating machine according to the present disclosure, with the movable plate fixing member being arranged in the mounting slot and the movement of the plate fixing member in the mounting slot being controlled by the elastic reset member, the plate fixing member can move into the mounting slot without an overpressure phenomenon of the glass plates at the plate fixing member when the top plate moves downwards and press-fits the upper glass plate and the lower glass plate. Therefore, the yield of products can be improved, and the production cost can be reduced.

In a further technical solution, one end of the elastic reset member is connected with the bottom of the mounting slot, and the other end thereof is connected with the second end of the plate fixing member, thus facilitating the mounting of the structure. Meanwhile, the elastic reset member may be directly used as a connector between the plate fixing member and the mounting slot, thus providing a relatively simple structure.

In a further technical solution, the elastic reset member is preferably a compression spring, which is convenient to mount and use.

In a further technical solution, the plate fixing member is connected with the mounting slot through the connecting member, and the plate fixing member is in sliding engagement with the connecting member to move in the mounting slot, so that the structure is relatively simple and convenient to realize.

In a further technical solution, the connecting member penetrates the compression spring, so that the compression spring can be mounted together with the connecting member, and the structure is more convenient to mount and use.

In a further technical solution, the plurality of connecting members are uniformly distributed on the plate fixing member, so that the mounting stability of the plate fixing member may be effectively improved, and the stress of the plate fixing member is more uniformly distributed.

In a further technical solution, the connecting member is a half thread bolt for ease mounting and use.

Compared with the prior art, in the top plate for the laminating machine according to the present disclosure, with the movable plate fixing member being arranged in the mounting slot and the movement of the plate fixing member in the mounting slot being controlled by the elastic reset member, the plate fixing member can move into the mounting slot without an overpressure phenomenon of the glass plates at the plate fixing member when the top plate moves downwards and press-fits the upper glass plate and the lower glass plate. Therefore, the yield of products can be improved, and the production cost can be reduced.

Compared with the prior art, in the laminating machine according to the present disclosure, with the movable plate fixing member being arranged in the mounting slot and the movement of the plate fixing member in the mounting slot being controlled by the elastic reset member, the plate fixing member can move into the mounting slot without an overpressure phenomenon of the glass plates at the plate fixing member when the top plate moves downwards and press-fits the upper glass plate and the lower glass plate. Therefore, the yield of products can be improved, and the production cost can be reduced.

The above-mentioned technical features may be combined in various appropriate manners or substituted by equivalent technical features, as long as the objective of the present disclosure can be fulfilled.

BRIEF DESCRIPTION OF THE DRAWINGS

The present disclosure will be described in more detail below based on merely non-finite examples with reference to the accompanying drawings. Wherein.

DETAILED DESCRIPTION OF THE EMBODIMENTS

To make the objectives, technical solutions and advantages of the present disclosure clearer, the technical solutions of the present disclosure will be described clearly and completely below. All of other embodiments, obtained by those of ordinary skill in the art based on the specific embodiments of the present disclosure without any creative effort, fall into the scope of the present disclosure.

Before the specific embodiments are described, directional terms mentioned in the present disclosure are defined as follows. In the present disclosure, the movement direction of a top plate in a laminating machine is called as the vertical direction.

EXAMPLE 1

Figure 1:
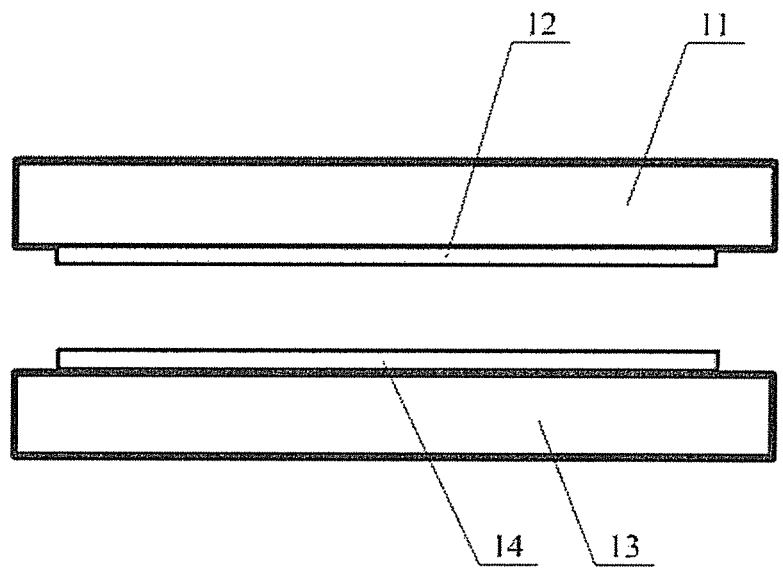
FIG. 1 schematically shows a laminating machine in the prior art.
Figure 2:
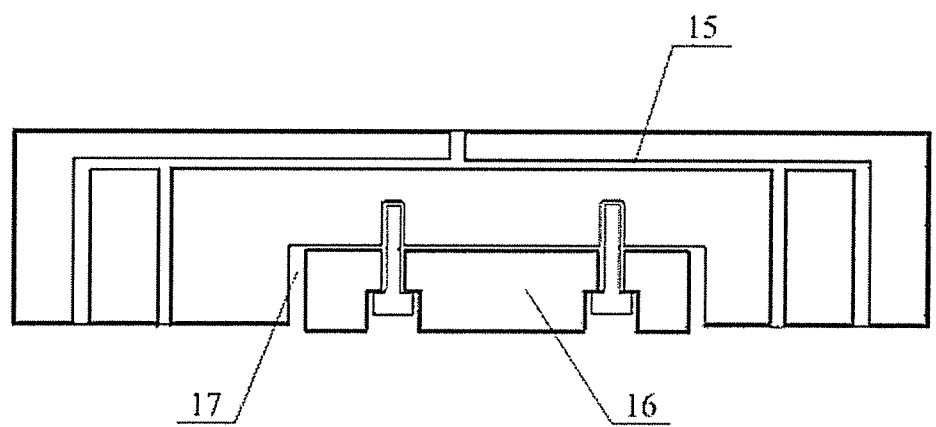
FIG. 2 schematically shows a structure of mounting a plate fixing member on a top plate in the prior art.
Figure 3:
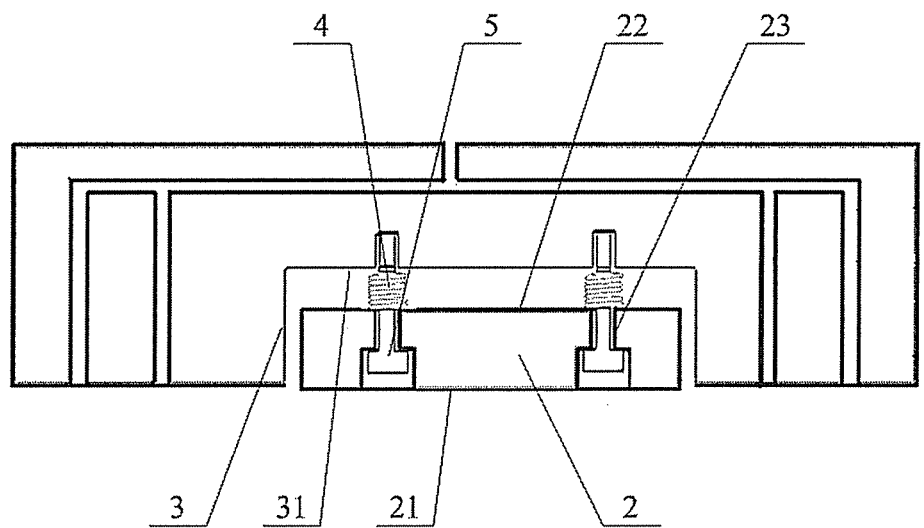
FIG. 3 schematically shows structure of a device for mounting a plate fixing member in a laminating machine provided in Example 1 of the present disclosure.
Figure 4:
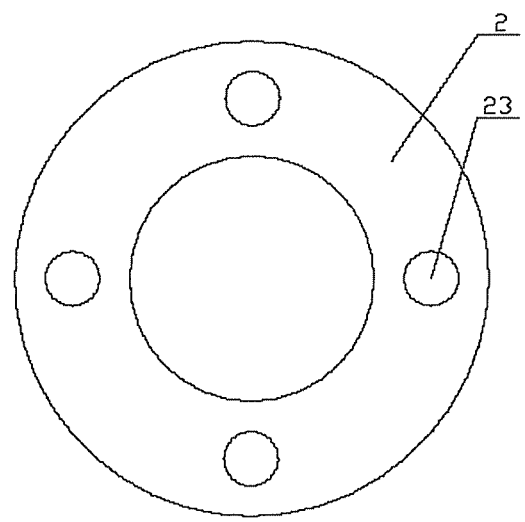
FIG. 4 is a bottom view of the plate fixing member for the laminating machine provided in Example 1 of the present disclosure.

As shown in FIG. 3 and FIG. 4, the device for mounting a plate fixing member 2 in a laminating machine provided in this example includes the plate fixing member 2 and a mounting slot 3 for mounting the plate fixing member 2. The plate fixing member 2 is disposed in the mounting slot 3, and can move vertically in the mounting slot 3. An elastic reset member 4 is arranged between the plate fixing member 2 and the mounting slot 3.

When the elastic reset member 4 stretches, a first end 21 of the plate fixing member 2 along the vertical direction extends to a region exterior of the opening of the mounting slot 3 along the vertical direction. When the first end 21 is subjected to a vertical pressure towards the interior of the mounting slot 3, the plate fixing member 2 moves vertically towards the interior of the mounting slot 3 and thus compresses the elastic reset member 4.

In use, the elastic reset member 4 stretches, and the first end 21 of the plate fixing member 2 protrudes out of the opening of the mounting slot 3. An upper glass plate is fed to a region beneath the first end 21 of the plate fixing member 2 by a manipulator, then is in contact with and engaged with the plate fixing member 2, and is fixed at the first end 21 through the plate fixing member 2. Subsequently, a top plate of the laminating machine moves vertically downwards, and thus the plate fixing member 2 drives the upper glass plate to move along. When the upper glass plate is in contact with and press fit with a lower glass plate, the upper glass plate is subjected to a vertical upward pressure, and transfers the pressure to the plate fixing member 2.

Therefore, the plate fixing member 2 starts compressing the elastic reset member 4, and moves towards the interior of the mounting slot 3 till the plate fixing member 2 is completely accommodated in the mounting slot 3 (namely, the first end 21 of the plate fixing member 2 is flush with the opening of the mounting slot 3). At this moment, the upper glass plate is in contact with the top plate for mounting the plate fixing member 2 as a whole, thus avoiding an overpressure phenomenon caused by over-large pressure of the upper glass plate at the plate fixing member 2.

With the movable plate fixing member 2 being arranged in the mounting slot 3 and the movement of the plate fixing member 2 in the mounting slot 3 being controlled by the elastic reset member 4, the plate fixing member 2 can move into the mounting slot 3 without the overpressure phenomenon of the glass plates at the plate fixing member 2 when the top plate moves downwards and press-fits the upper glass plate and the lower glass plate. Therefore, the yield of products can be improved, and the production cost can be reduced.

The plate fixing member 2 is located in the mounting slot 3 and can move vertically therein. The specific structure for mounting the plate fixing member 2 may be in multiple forms, which are not listed one by one herein. All arrangements, which can achieve that the plate fixing member 2 is located in the mounting slot 3 so that the plate fixing member 2 can move vertically in the mounting slot 3 and will not be separated from the mounting slot 3, should fall within the scope of the present disclosure.

The contact and engagement between the upper glass plate and the plate fixing member 2 may be realized through an upward lifting action provided by the manipulator. Further preferably, the upper glass plate may be sucked through a vacuum pipeline arranged on the top plate, in order to realize the contact and engagement between the upper glass plate and the plate fixing member 2.

The plate fixing member 2 may have a structure of sucking disc, and therefore the upper glass plate can be adsorbed and fixed by the plate fixing member 2 through the contact and engagement pressure between the upper glass plate and the plate fixing member 2. Further preferably, the plate fixing member 2 may be made from viscous material, and therefore the upper glass plate is bonded and fixed by the plate fixing member 2 through the contact and engagement pressure between the upper glass plate and the plate fixing member 2. It should be understood that the combination of both structures as mentioned above are also suitable for the plate fixing member 2, namely, the plate fixing member 2 can have the structure of sucking disc and at the same time be made from viscous material.

It should be further illustrated that the plate fixing member 2 may also be configured as other structures or forms, as long as the plate fixing member 2 can be engaged and fixed with the upper glass plate and the upper glass plate can be removed from the manipulator and then fixed at the lower end of the top plate, which should fall within the scope of the present disclosure.

In this example, when the plate fixing member 2 is mounted in the mounting slot 3, in order that the elastic reset member 4 can be conveniently placed between the plate fixing member 2 and the mounting slot 3, one end of the elastic reset member 4 may be connected with the vertical bottom 31 of the mounting slot 3 along the vertical direction, and the other end thereof may be connected with the vertical second end 22 of the plate fixing member 2 along the vertical direction.

Meanwhile, with such a mounting structure, the elastic reset member 4 can be directly used as a connector between the plate fixing member 2 and the mounting slot 3. With the plate fixing member 2 being directly connected with the mounting slot 3 through the elastic reset member 4, the plate fixing member 2 can move vertically in the mounting slot 3 and will not be separated from the mounting slot 3. This results in a structure that is relatively simple and convenient to operation.

In this example, the elastic reset member 4 may be implemented in multiple forms, for example, a torsion spring, a hydraulic or pneumatic reset member, and the like. Preferably, the elastic reset member 4 can be a compression spring, which is relatively common and convenient to purchase and use in a large quantity, thus reducing the production cost.

In this example, in order to mount the plate fixing member 2 in the mounting slot 3 in a convenient manner, the plate fixing member 2 can be connected and fixed with the mounting slot 3 through at least one connecting member 5. The connecting member 5 vertically penetrates the plate fixing member 2, and is fixedly connected with the vertical bottom 31 of the mounting slot 3. The plate fixing member 2 is in sliding engagement with the connecting member 5.

Specifically, as shown in FIG. 3, after the connecting member 5 penetrates a through hole 23 in the plate fixing member 2, one end of the connecting member 5 is fixedly connected with the bottom 31 of the mounting slot 3. To facilitate mounting, the plate fixing member 2 is fixed in the mounting slot 3 through the limitation effect provided by the connecting member 5, so that the plate fixing member 2 can be prevented from falling from the mounting slot 3. Meanwhile, the plate fixing member 2 may also slide along the connecting member 5, so that the plate fixing member 2 can move vertically in the mounting slot 3, and thus movement of the plate fixing member 2 in the mounting slot 3 can be achieved.

In this example, a compression spring is further arranged between the plate fixing member 2 and the mounting slot 3. In order to facilitate the mounting of the compression spring and prevent the compression spring from being twisted, dislocated or the like, the connecting member 5 preferably penetrates the plate fixing member 2 and then further penetrates the compression spring. In this manner, the compression spring can be mounted with the connecting member 5 together, so that the structure is more convenient to mount and use.

In this example, the connecting member 5 plays a connecting role for the plate fixing member 2 and a guiding role when the plate fixing member 2 moves. Therefore, the connecting member 5 should ensure the mounting stability and the guiding stability for the plate fixing member 2. Thus, a plurality of connecting members 5 are provided and distributed on the plate fixing member 2 in a uniform manner. Namely, a plurality of penetrating holes 23 for mounting the connecting members 5 are formed in the plate fixing member 2, in particular in a uniform manner. As shown in FIG. 4, the plate fixing member 2 is in a circular shape, and the plurality of penetrating holes 23 are uniformly distributed along the circumferential direction, forming an annular shape. It should be understood that the arrangement of the penetrating holes 23 is not merely limited to the above, and the penetrating holes 23 may be arranged according to the specific shape of the plate fixing member 2.

In this example, the connecting member 5 may be simply configured as a bolt, and no thread is provided in the penetrating hole 23. In this case, the bolt can directly penetrate the penetrating hole 23 and then is connected with the bottom 31 of the mounting slot 3. However, because the first end face of the plate fixing member 2 is in contact with and engaged with the upper glass plate, the fitness between the first end face and the contact face of the upper glass plate is crucial. Thus, to ensure that the first end face is in a horizontal state as much as possible, the connecting member 5 is preferably configured as a half thread bolt, through which the tightening depth of the bottom 31 of the mounting slot 3 may be effectively controlled. Therefore, it can be ensured that the first end face of the mounted plate fixing member 2 is in the horizontal state as much as possible, and then the fitness between the first end face and the contact face of the upper glass plate can be ensured.

EXAMPLE 2

Figure 5:
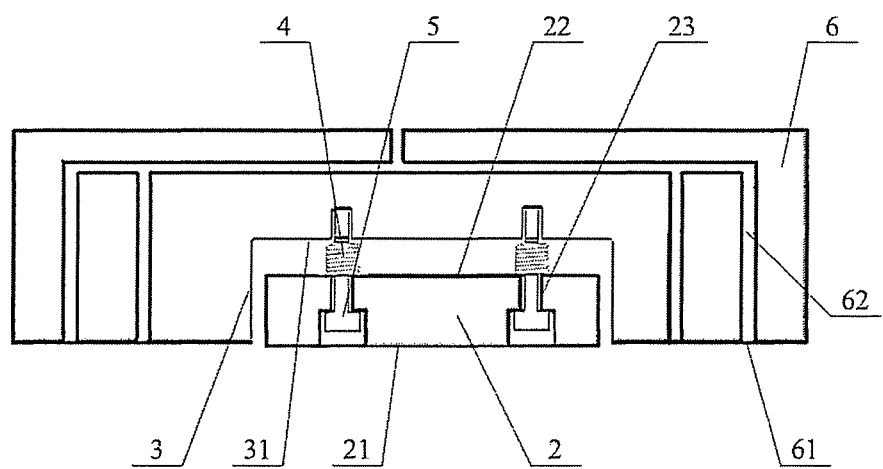
FIG. 5 schematically shows structure of the top plate for the laminating machine provided in Example 2 of the present disclosure.
Figure 6:
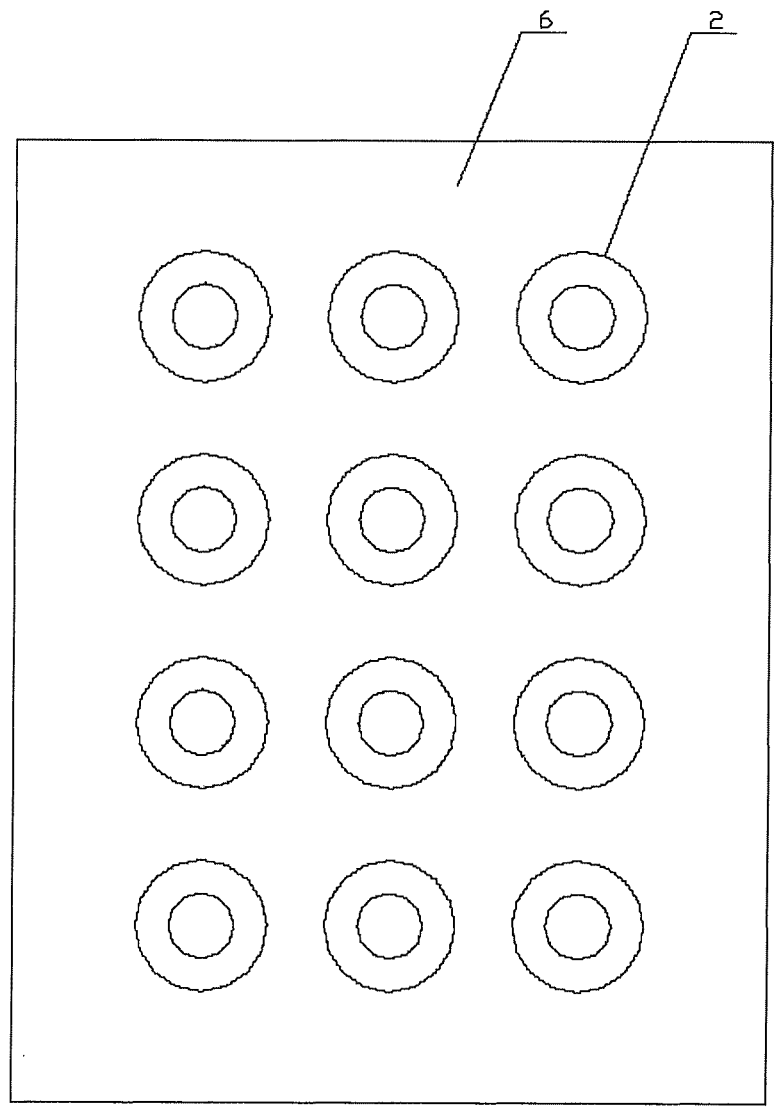
FIG. 6 is a bottom view of the top plate for the laminating machine provided in Example 2 of the present disclosure.

As shown in FIG. 5 and FIG. 6, a top plate for a laminating machine provided in this example includes a plate body 6, and at least one device for mounting the plate fixing member 2 according to Example 1, which is arranged on the plate body 6. In this example, the mounting slot 3 is formed at the lower end of the plate body 6 along the vertical direction.

Further, preferably, to ensure the engagement stability of an upper glass plate and the top plate, a plurality of devices for mounting the plate fixing member 2 may be uniformly distributed on the plate body 6, see FIG. 5.

In this example, the upper glass plate can be engaged with the plate fixing member 2 on the plate body through an upward lifting action provided by a manipulator. Further, preferably, a vacuum suction port 61 can be formed at the lower end of the plate body 6 along the vertical direction, and a vacuum pipeline 62 communicated with the vacuum suction port 61 is formed in the plate body 6. Thus, the upper glass plate can be sucked upwardly through evacuation, see FIG. 6.

EXAMPLE 3

A laminating machine provided in this example includes a base plate, and the top plate for the laminating machine according to Example 2.

Finally, it should be noted that the preceding embodiments and examples are merely used for illustrating the technical solutions of the present disclosure, rather than limiting the present disclosure. Though the present disclosure is illustrated in detail with reference to the preceding embodiments and examples, it should be understood by those of ordinary skill in the art that modifications may still be made to the technical solutions recited in the preceding embodiments or examples, or equivalent alterations may be made to a part of technical features thereof. These modifications or alterations do not make the nature of corresponding technical solutions depart from the spirit and scope of the technical solutions of the embodiments or examples of the present disclosure.

LIST OF REFERENCE SIGNS

11 top plate
12 upper glass
13 base plate
14 lower glass
15 vacuum pipeline
16 plate fixing member
17 mounting slot
2 plate fixing member
21 first end
22 second end
23 penetrating hole
3 mounting slot
31 bottom
4 elastic reset member
5 connecting member
6 plate body
61 vacuum suction port
62 vacuum pipeline

The invention claimed is:

1. A device for mounting a plate fixing member in a laminating machine, including the plate fixing member and a mounting slot for mounting the plate fixing member, wherein the plate fixing member is arranged in the mounting slot and can move vertically in the mounting slot, and an elastic reset member is arranged between the plate fixing member and the mounting slot;

when the elastic reset member stretches, a first end of the plate fixing member along a vertical direction extends to a region exterior of the opening of the mounting slot along the vertical direction; and when the first end is subjected to a vertical pressure towards the interior of the mounting slot, the plate fixing member moves vertically towards the interior of the mounting slot and thus compresses the elastic reset member, wherein one end of the elastic reset member is vertically connected with a vertical bottom of the mounting slot, and the other end thereof is vertically connected with a vertical second end of the plate fixing member.

2. The device according to claim 1, wherein the elastic reset member is a compression spring.

3. The device according to claim 2, wherein the plate fixing member is connected and fixed with the mounting slot through at least one connecting member, which vertically penetrates the plate fixing member and is fixedly connected with the vertical bottom of the mounting slot, the plate fixing member being in sliding engagement with the connecting member.

4. The device according to claim 3, wherein the connecting member penetrates the compression spring.

5. The device according to claim 3, wherein a plurality of connecting members are provided and uniformly distributed on the plate fixing member.

6. The device according to claim 3, wherein the connecting member is a half thread bolt.

7. A top plate for a laminating machine, including a plate body and at least one device for mounting a plate fixing member on the plate body, the device comprising a mounting slot for mounting the plate fixing member and formed at a vertical lower end of the plate body, wherein the plate fixing member is arranged in the mounting slot and can move vertically in the mounting slot, and an elastic reset member is arranged between the plate fixing member and the mounting slot;

when the elastic reset member stretches, a first end of the plate fixing member along a vertical direction extends to a region exterior of the opening of the mounting slot along the vertical direction; and when the first end is subjected to a vertical pressure towards the interior of the mounting slot, the plate fixing member moves vertically towards the interior of the mounting slot and thus compresses the elastic reset member, wherein one end of the elastic reset member is vertically connected with a vertical bottom of the mounting slot, and the other end thereof is vertically connected with a vertical second end of the plate fixing member.

8. The top plate according to claim 7, wherein the elastic reset member is a compression spring.

9. The top plate according to claim 8, wherein the plate fixing member is connected and fixed with the mounting slot through at least one connecting member, which vertically penetrates the plate fixing member and is fixedly connected with the vertical bottom of the mounting slot, the plate fixing member being in sliding engagement with the connecting member.

10. The device according to claim 9, wherein the connecting member penetrates the compression spring.

11. The device according to claim 9, wherein a plurality of connecting members are provided and uniformly distributed on the plate fixing member.

12. The device according to claim 9, wherein the connecting member is a half thread bolt.

13. The device according to claim 7, wherein a vacuum suction port is formed at the vertical lower end of the plate body, and a vacuum pipeline communicated with the vacuum suction port is arranged in the plate body.

14. A laminating machine including a base plate and a top plate, the top plate including a plate body, and a device for mounting a plate fixing member on the plate body, the device comprising a mounting slot for mounting the plate fixing member, formed at the vertical lower end of the plate body, wherein the plate fixing member is arranged in the mounting slot and can move vertically in the mounting slot, and an elastic reset member is arranged between the plate fixing member and the mounting slot;

when the elastic reset member stretches, a first end of the plate fixing member along a vertical direction extends to a region exterior of the opening of the mounting slot along the vertical direction; and when the first end is subjected to a vertical pressure towards the interior of the mounting slot, the plate fixing member moves vertically towards the interior of the mounting slot and thus compresses the elastic reset member, wherein one end of the elastic reset member is vertically connected with a vertical bottom of the mounting slot, and the other end thereof is vertically connected with a vertical second end of the plate fixing member.

15. The laminating machine according to claim 14, wherein the elastic reset member is a compression spring.

16. The laminating machine according to claim 15, wherein the plate fixing member is connected and fixed with the mounting slot through at least one connecting member, which vertically penetrates the plate fixing member and is fixedly connected with the vertical bottom of the mounting slot, the plate fixing member being in sliding engagement with the connecting member.

17. The laminating machine according to claim 16, wherein the connecting member penetrates the compression spring.

* * * * *